US012570230B2

(12) United States Patent
White

(10) Patent No.: US 12,570,230 B2
(45) Date of Patent: Mar. 10, 2026

(54) RETAINERLESS SENSOR MOUNTING ARRANGEMENT FOR A METAL BUMPER

(71) Applicant: Robert Bosch GmbH, Stuttgart (DE)

(72) Inventor: Michael T. White, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 18/501,807

(22) Filed: Nov. 3, 2023

(65) Prior Publication Data

US 2025/0145099 A1      May 8, 2025

(51) Int. Cl.
  B60R 19/48 (2006.01)
  B23P 19/04 (2006.01)
  B60R 19/18 (2006.01)
(52) U.S. Cl.
  CPC ............ B60R 19/483 (2013.01); B23P 19/04 (2013.01); B60R 2019/1813 (2013.01)
(58) Field of Classification Search
  CPC ..... B60R 19/02; B60R 19/023; B60R 19/483; B60R 2019/1813
  USPC .................................................. 293/117, 121
  See application file for complete search history.

(56) References Cited

U.S. PATENT DOCUMENTS

| | | | |
|---|---|---|---|
| 6,239,134 B1 | 5/2001 | Sabb et al. | |
| 7,325,775 B2 | 2/2008 | Chen | |
| 7,384,082 B2 * | 6/2008 | Blake ................... | B60R 19/483 293/117 |
| 7,537,224 B2 | 5/2009 | Morris et al. | |
| 7,753,419 B2 * | 7/2010 | Kondo .................. | B60R 19/483 180/274 |
| 8,910,986 B1 * | 12/2014 | Appukutty ............ | B60R 19/483 296/187.03 |
| 9,381,880 B2 * | 7/2016 | Matecki .................. | B60R 19/18 |
| 10,254,401 B2 * | 4/2019 | Suyama .................. | G01S 7/521 |
| 11,353,545 B2 | 6/2022 | Bae | |
| 2006/0232081 A1 * | 10/2006 | Sato ...................... | B60R 19/483 293/117 |
| 2023/0070901 A1 | 3/2023 | Ueda et al. | |

FOREIGN PATENT DOCUMENTS

| DE | 102015016206 A1 * | 6/2017 | ............. G01S 7/521 |
|---|---|---|---|
| EP | 3339105 A1 * | 6/2018 | ............. G01S 7/521 |

* cited by examiner

*Primary Examiner* — Jason S Daniels
(74) *Attorney, Agent, or Firm* — Michael Best & Friedrich LLP

(57)     ABSTRACT

A method of coupling a sensor to a metal bumper for a vehicle includes providing a substrate configured as a sheet of metal for forming the metal bumper, forming an aperture within sheet of metal, and inserting the sensor into the aperture such that the sensor is directly supported by the sheet of metal without an intervening retainer.

19 Claims, 7 Drawing Sheets

RETAINERLESS SENSOR MOUNTING ARRANGEMENT FOR A METAL BUMPER

BACKGROUND OF THE DISCLOSURE

The present disclosure relates to metal bumpers for vehicles. More particularly, the present disclosure relates to mounting a sensor to a metal bumper for a vehicle.

SUMMARY OF THE DISCLOSURE

The present disclosure provides, in one aspect, a method of coupling a sensor to a metal bumper for a vehicle. The method includes providing a substrate configured as a sheet of metal for forming the metal bumper, forming an aperture within the sheet of metal, and inserting the sensor into the aperture such that the sensor is directly supported by the sheet of metal without an intervening retainer.

The present disclosure provides, in another aspect, a method of coupling a sensor to a metal bumper for a vehicle. The method includes providing the metal bumper, forming an aperture within the metal bumper, forming, from the material of the metal bumper, a tab configured to support the sensor, and inserting the sensor into the aperture. The tab is configured to support the sensor and extends at least partially inside a perimeter of the aperture. The sensor is secured directly to the metal bumper without an intervening retainer.

The present disclosure provides, in yet another aspect, a metal bumper assembly for a vehicle. The metal bumper assembly includes a mounting portion configured to secure the metal bumper to the vehicle, an aperture disposed within the metal bumper, a tab integrally formed from the same material as the metal bumper, and a sensor disposed within the aperture and coupled to the tab. The tab extends from a perimeter of the aperture. The sensor is directly supported by the metal bumper without an intervening retainer.

DETAILED DESCRIPTION

Vehicles, such as pickup trucks, may include front and rear bumpers formed of metal. The bumpers are not located behind a plastic cover. In other words, the bumpers are exposed to the front and/or rear of the vehicle. Many of such vehicles include sensors coupled to at least one of the front or the rear bumpers to collect information for driver assistance aids. For example, a pickup truck may include an ultrasonic sensor coupled to a front bumper of the pickup truck. The ultrasonic sensor may collect data representative of a distance between the sensor and an object (e.g., an object in front of the vehicle) to aid a driver in parking the truck. Such sensors are typically coupled to the bumper via a retainer. In some implementation, a vehicle may include a plurality of sensors, and it is desirable to decrease the number of components necessary for supporting the sensors to decrease the overall cost of manufacturing the vehicle. The present disclosure thus provides a method for coupling a sensor to a metal bumper for a vehicle without an intervening structure (e.g., a retainer). While a pickup truck is mentioned above as an example vehicle in which a bumper according to the present disclosure may be implemented, it should be understood that the metal bumper and sensor mounting arrangement may be implemented in other vehicle types that include exposed metal bumpers and would benefit from a sensor.

Figure 1:
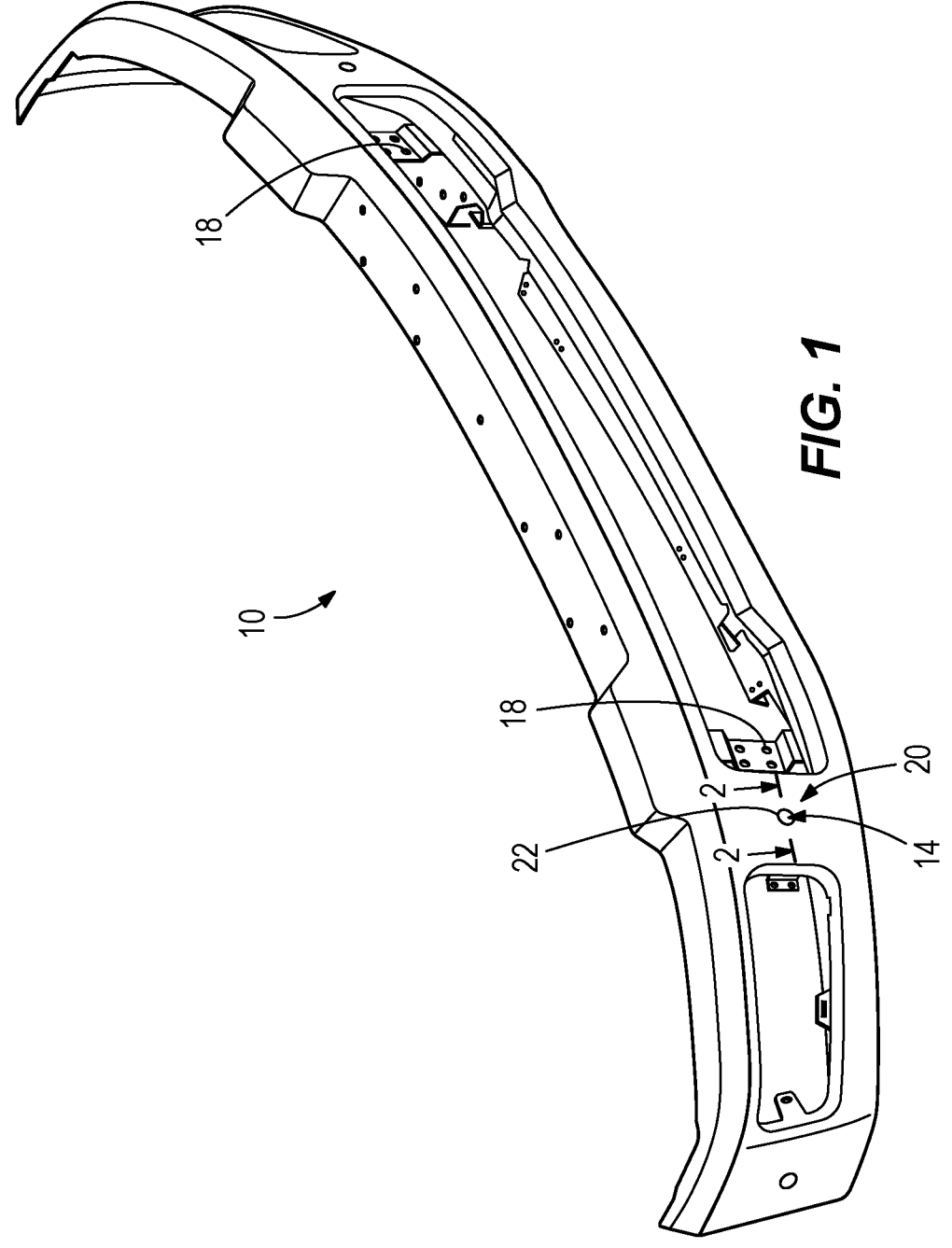
FIG. 1 illustrates a perspective view of a metal bumper for a vehicle including a sensor mounted thereon.

FIG. 1 illustrates a metal structure for a vehicle that is exposed to the front or rear of the vehicle. In the illustrated embodiment, the metal structure is a bumper 10, such as a front bumper for a pickup truck. The bumper 10 is formed of metal, such as steel. It should be understood that in some embodiments the bumper 10 may be formed from metals other than steel, or may be formed only partially of steel (e.g., at a sensor mounting location). The bumper 10 may be formed from a substrate or sheet of material that is subsequently formed (e.g., stamped) into the shape of the bumper 10. A sensor 14 is coupled to the bumper 10 without the use of an intervening retainer. In other words, the sensor 14 is supported directly by the bumper 10. The bumper 10 includes a mounting portion, illustrated as a plurality of mounting flanges 18, to be coupled to a vehicle (not shown). The plurality of mounting flanges 18 secure the bumper 10 to the vehicle in a manner that will be understood by one of ordinary skill in the art. The bumper 10 further includes a sensor mounting arrangement 20 having an aperture 22 for receiving and supporting the sensor 14 relative to the bumper 10.

Figure 2:
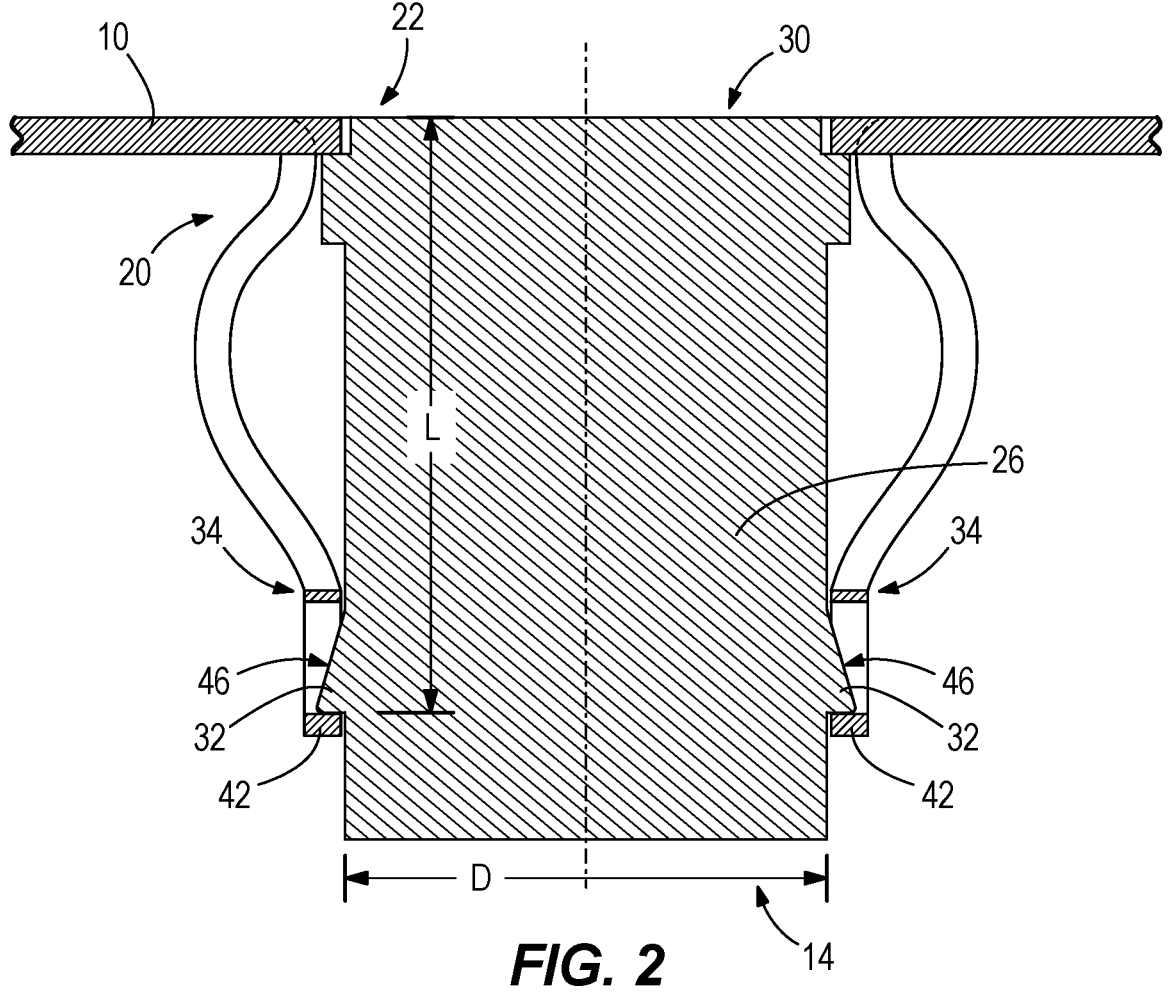
FIG. 2 is a cross-sectional view of a portion of the metal bumper of FIG. 1, taken along section line 2-2 in FIG. 1.

FIG. 2 illustrates a cross-sectional view of the sensor 14 in accordance with an embodiment of the present disclosure. The sensor 14 includes a body 26 to be coupled to the bumper 10 and a sensing component 30 supported by the body 26. The body 26 further includes a locking feature 32 to couple the sensor 14 to the bumper 10. When coupled to the bumper 10, the sensing component 30 is positioned forward of the body 26 and proximate the bumper 10, while at least a portion of the body 26 of the sensor 14 extends into the aperture 22 and rearwardly of the bumper 10. In some embodiments, the sensor 14 is an ultrasonic sensor. It should be understood that sensors of other types and shapes may be coupled to the bumper 10 in the manner described herein by adjusting a shape of the aperture 22. Furthermore, while a single sensor 14 is described herein, it should be understood that, in some embodiments, a plurality of sensors 14 may be coupled to the bumper 10. The plurality of sensors 14 may be all of the same type or may be formed of various different sensors 14.

Figure 3:
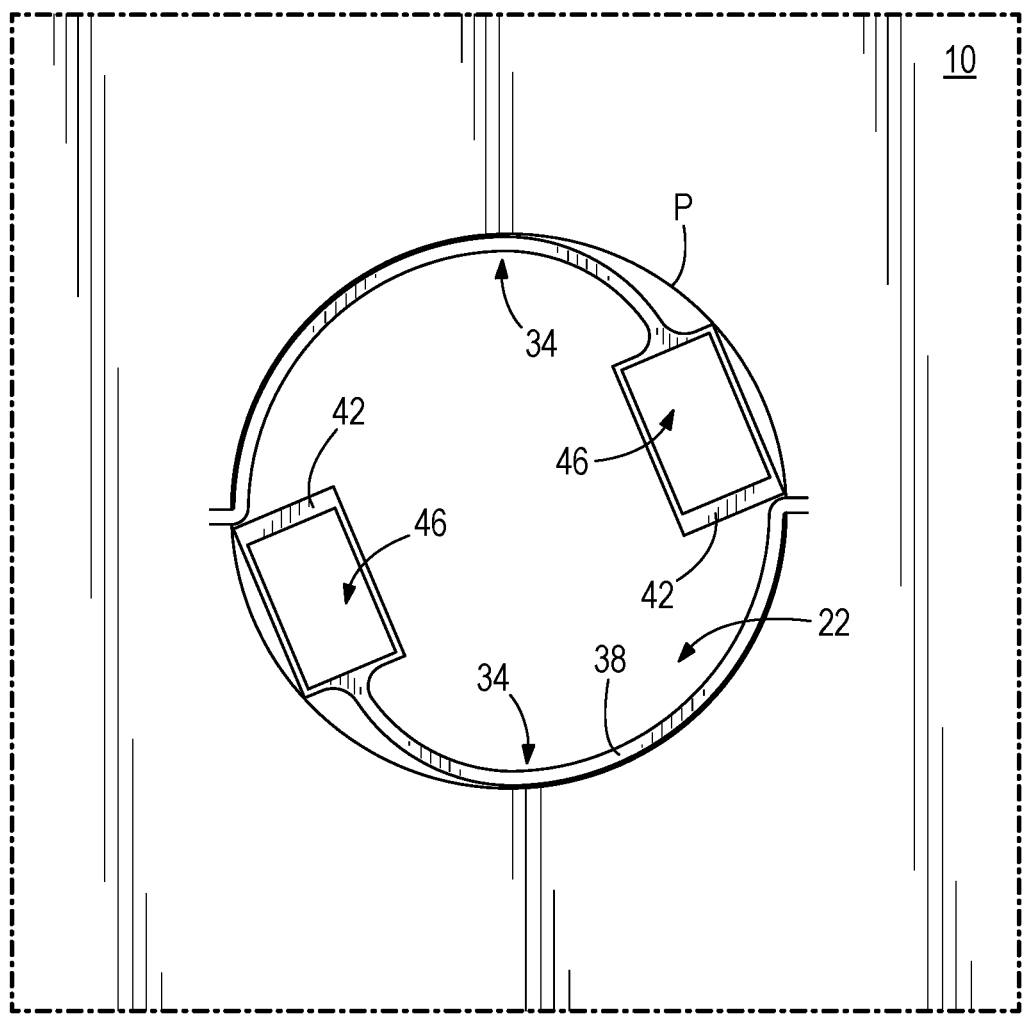
FIG. 3 illustrates a portion of the metal bumper of FIG. 1, prior to mounting the sensor thereon.

With reference to FIG. 1, the aperture 22 is located within the bumper 10 to properly position the sensor 14 without interfering with operation of the bumper 10. The sensor 14 is thus positioned to be able to collect data without interfering with operation of the bumper 10. Referring now to FIG. 3, the aperture 22 is defined by a perimeter P having a cross-sectional area that corresponds to a cross-sectional area of the sensor 14. In the illustrated embodiment, the perimeter P of the aperture 22 is circular in cross-section. The perimeter P of the aperture 22 is not required to form a perfect circular cross-section. For example, the perimeter P may be overall circular and includes portions that deviate from the circle (e.g., flat portions). In other embodiments, the perimeter P may be rectangular, polygonal, or be defined by other regular or irregular geometric shapes. Regardless of the shape of the perimeter P, the cross-sectional shape of the perimeter P corresponds to a shape of the sensor 14. The sensor mounting arrangement 20 further includes at least one tab 34 extending from the perimeter P of the aperture 22. The tab 34 is engageable with the sensor 14 to support the sensor 14 relative to the bumper 10. The tab 34 is integrally formed from the same material as the bumper 10. Thus, the tab 34 is not attached to the bumper 10 via a post-processing method (e.g., welding or securing with additional fasteners) during manufacturing of the bumper 10. Rather, as will be described in greater detail herein, the tab 34 is formed by selectively removing material from the bumper 10 during formation of the aperture 22.

The illustrated embodiment includes two tabs 34 extending from the perimeter P of the aperture 22. However, it should be understood that an aperture 22 may be formed with a single tab 34 or more than two tabs 34 based on the desired number of mounting locations for the sensor 14. In other words, if a sensor 14 includes three connection points to be properly supported, a sensor mounting arrangement 20 may be formed with three tabs 34 extending from a perimeter P of the aperture 22 in which the sensor 14 is to be located.

With continued reference to FIGS. 3-7, each tab 34 includes a spacer 38 extending from the perimeter P of the aperture 22 and a support portion 42 disposed at an end of the spacer 38 opposite the aperture 22. As will be understood by one of ordinary skill in the art, the support portion 42 is shaped to be attached to the sensor 14. In the illustrated embodiment, the support portion 42 includes an aperture 46 in which a portion of the sensor 14 is receivable to support the sensor 14 relative to the bumper 10. The support portion 42 is generally rectangular in shape, and the aperture 46 is also generally rectangular in shape. Thus, the support portion 42 and the aperture 46 are similar in shape. In some embodiments, the aperture 46 is not similar in shape to the support portion 42. The aperture 42 may have any shape corresponding to the portion of the sensor 14 to which it is to be coupled.

With reference to FIG. 2, the sensor 14 is sized such that a length L of the body 26 is longer than a diameter D of the aperture 22. The length L of the body 26 is defined as the distance between the sensing component 30 and the locking feature 32. The tab 34 is formed from material originally located within the perimeter P of the aperture 22. Thus, to form a spacer 38 of a length necessary to support the sensor 14, the spacer 38 is curved similarly to the aperture 22. An arc length of the aperture 22 is sufficient to form a length of the spacer 38. In the illustrated embodiment, each spacer 38 extends approximately half of the perimeter P of the aperture 22.

Figure 4:
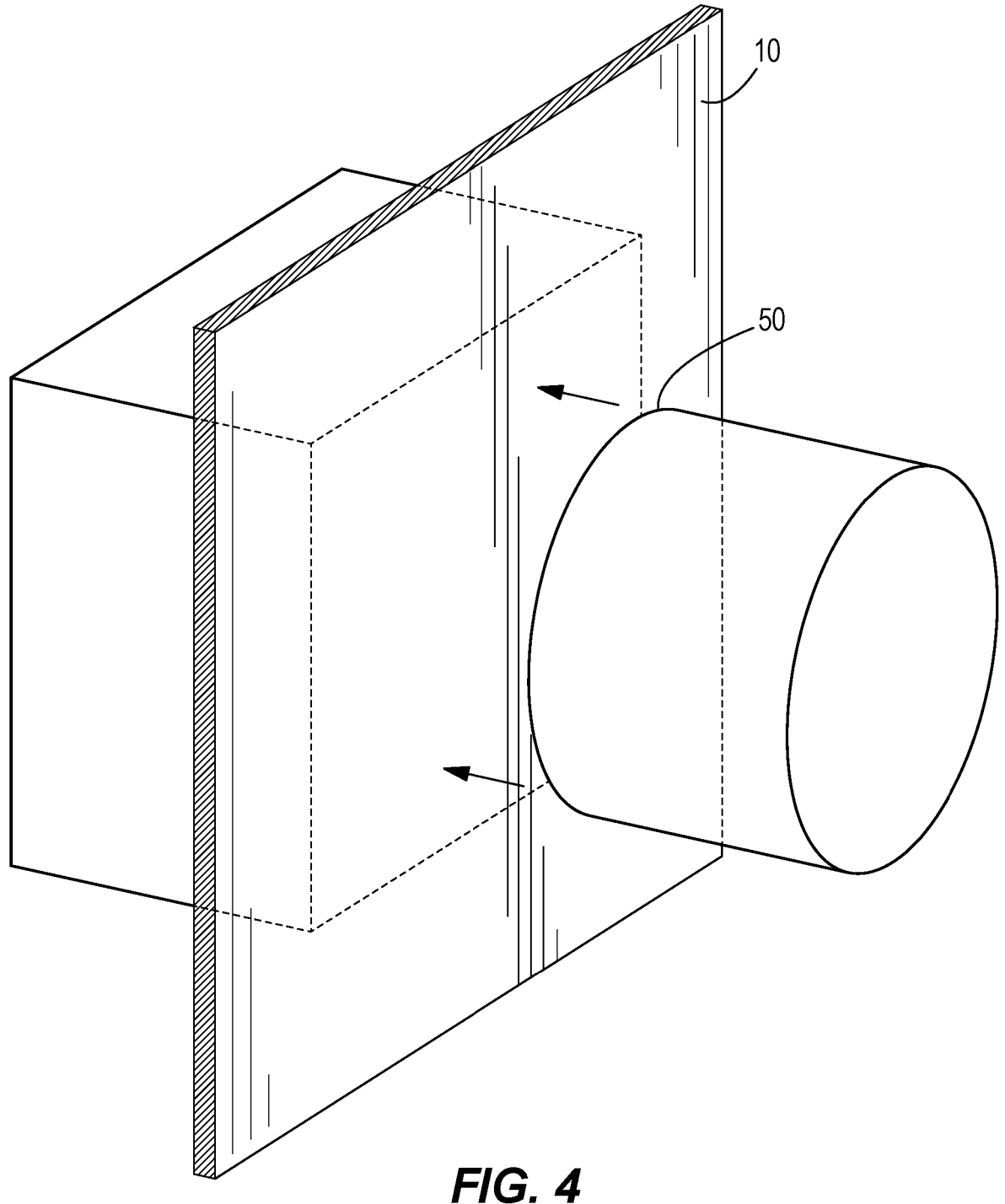
FIG. 4 illustrates a portion of the metal bumper of FIG. 1, prior to formation of a sensor mounting formation.

A method for coupling the sensor 14 to the bumper 10, including manufacture of the bumper 10, will now be described with reference to FIGS. 4-6. First, the bumper 10 is provided and a desired location for the sensor 14 is determined. In some embodiments, providing the bumper 10 includes providing a substrate for the bumper 10 (e.g., sheet of steel), while in other embodiments the bumper 10 is pre-formed with the desired contour. The sensor mounting arrangement 20 is then formed within the bumper 10. In some embodiments, forming the sensor mounting arrangement 20 may occur simultaneously with forming the bumper 10 from a sheet of metal. In particular, the bumper 10 undergoes a shaping process, such as stamping, to give the bumper 10 its contour, and the stamping process includes localized punching to form (i.e., die cut) the aperture 22 and the tab(s) 34. As noted above, the stamping of the overall shape of the bumper 10 can be separate from, either before or after, the punching of the features of the sensor mounting arrangement 20. In some embodiments, the aperture 22 and the tab 34 may be formed from other manufacturing processes capable of removing material from the metal bumper (e.g., laser cutting, milling, etc.). The tabs 34 are formed from material originally located within the perimeter P of the aperture 22. Thus, the material removal process does not remove the entirety of the material located within the perimeter P. In the illustrated embodiment, a stamping die set 50 is shaped to remove material forming a majority of the perimeter P of the aperture 22, while leaving in place material that forms the tab 34. The stamping die set 50 also includes a punch that removes material from the tab 34 to form the aperture 46 within the support portion 42. The stamping die set 50 simultaneously forms the aperture 22 and the tab 34 within the aperture 22. In other embodiments, the stamping die set 50 can include multiple punches used to remove material from the bumper 10 to create the aperture 22 and the tab 34.

Figure 5:
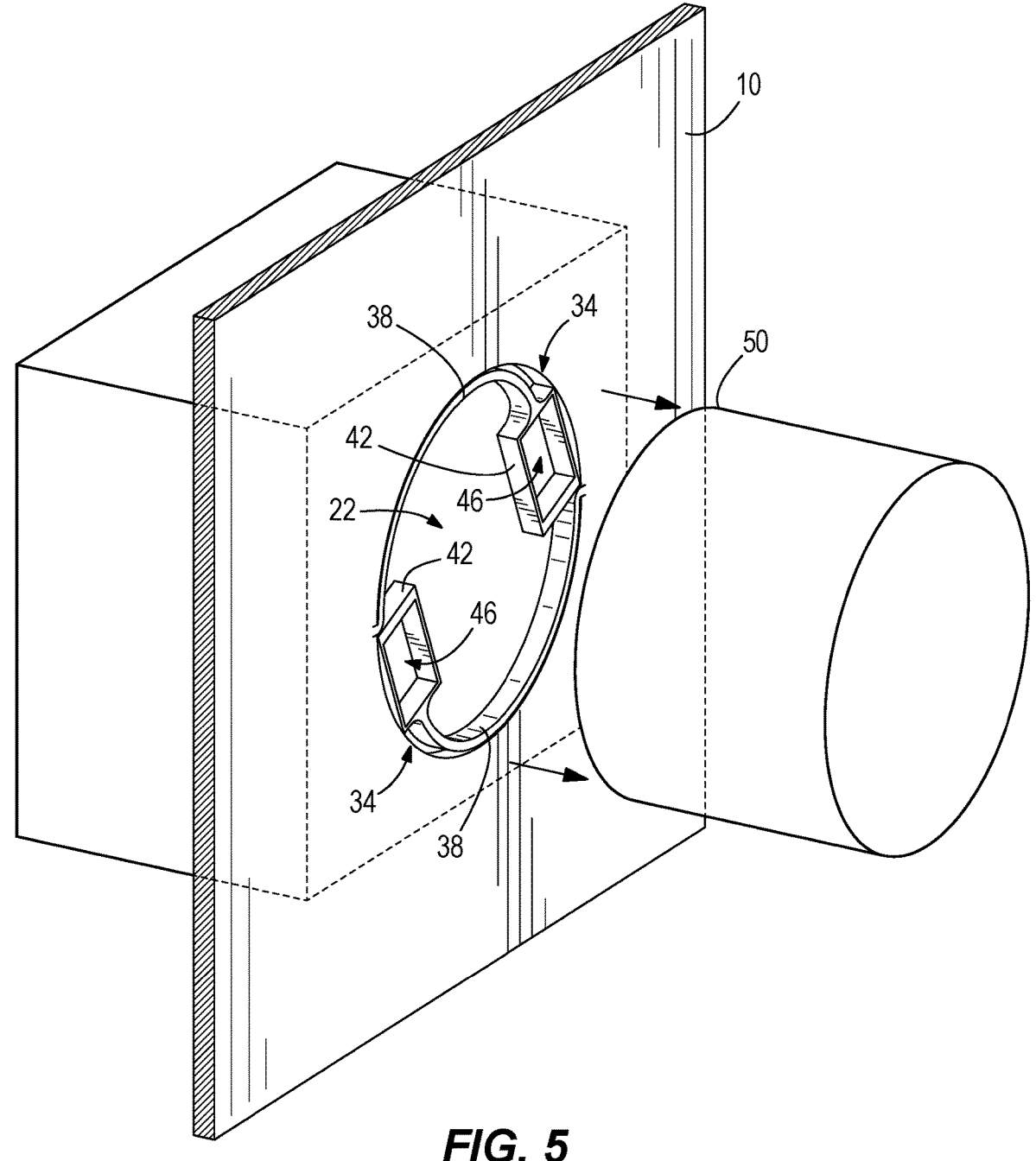
FIG. 5 illustrates the portion of the metal bumper of FIG. 4, after formation of the sensor mounting formation.
Figure 6:
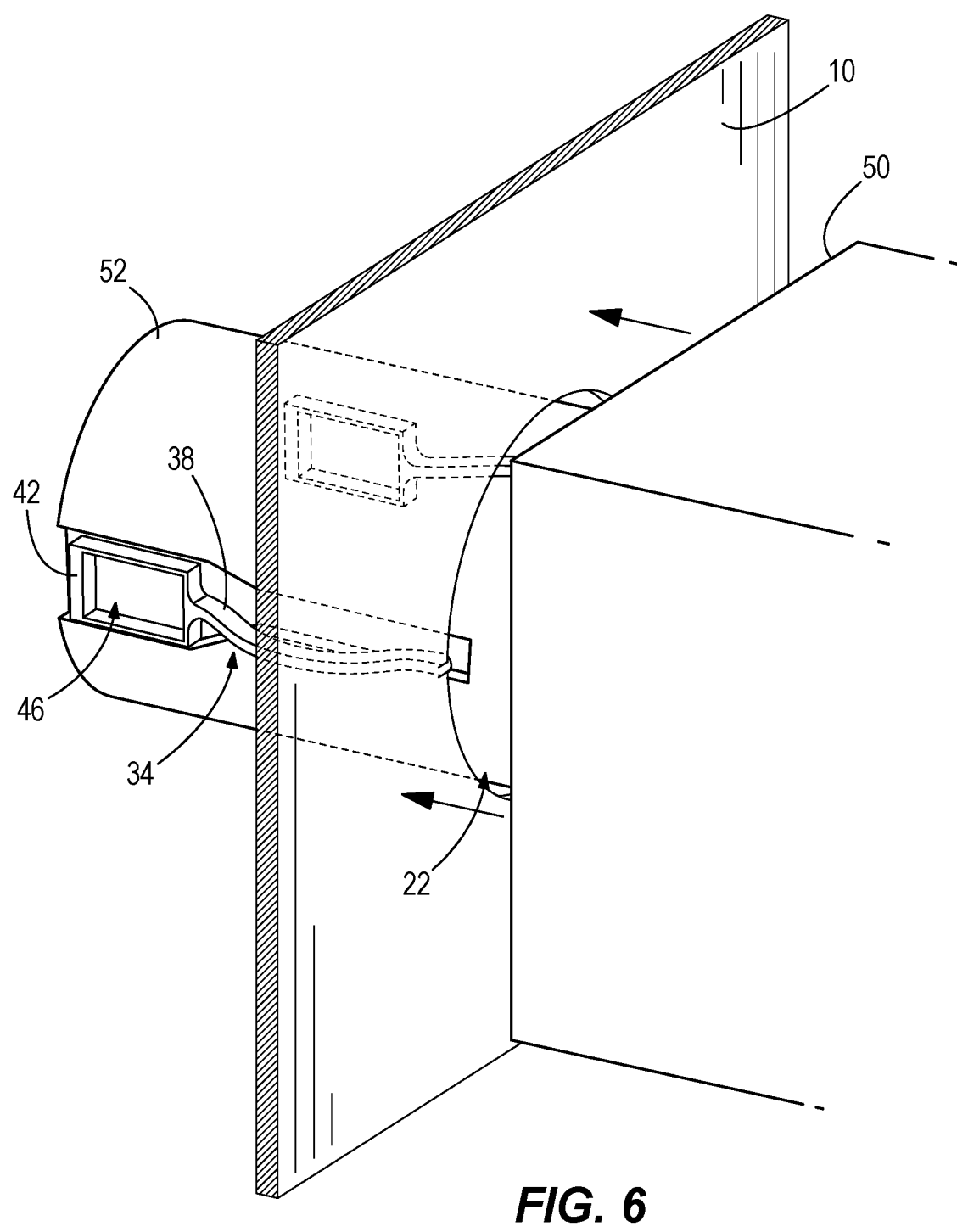
FIG. 6 illustrates a process for deforming a portion of the sensor mounting formation of FIG. 5.
Figure 7:
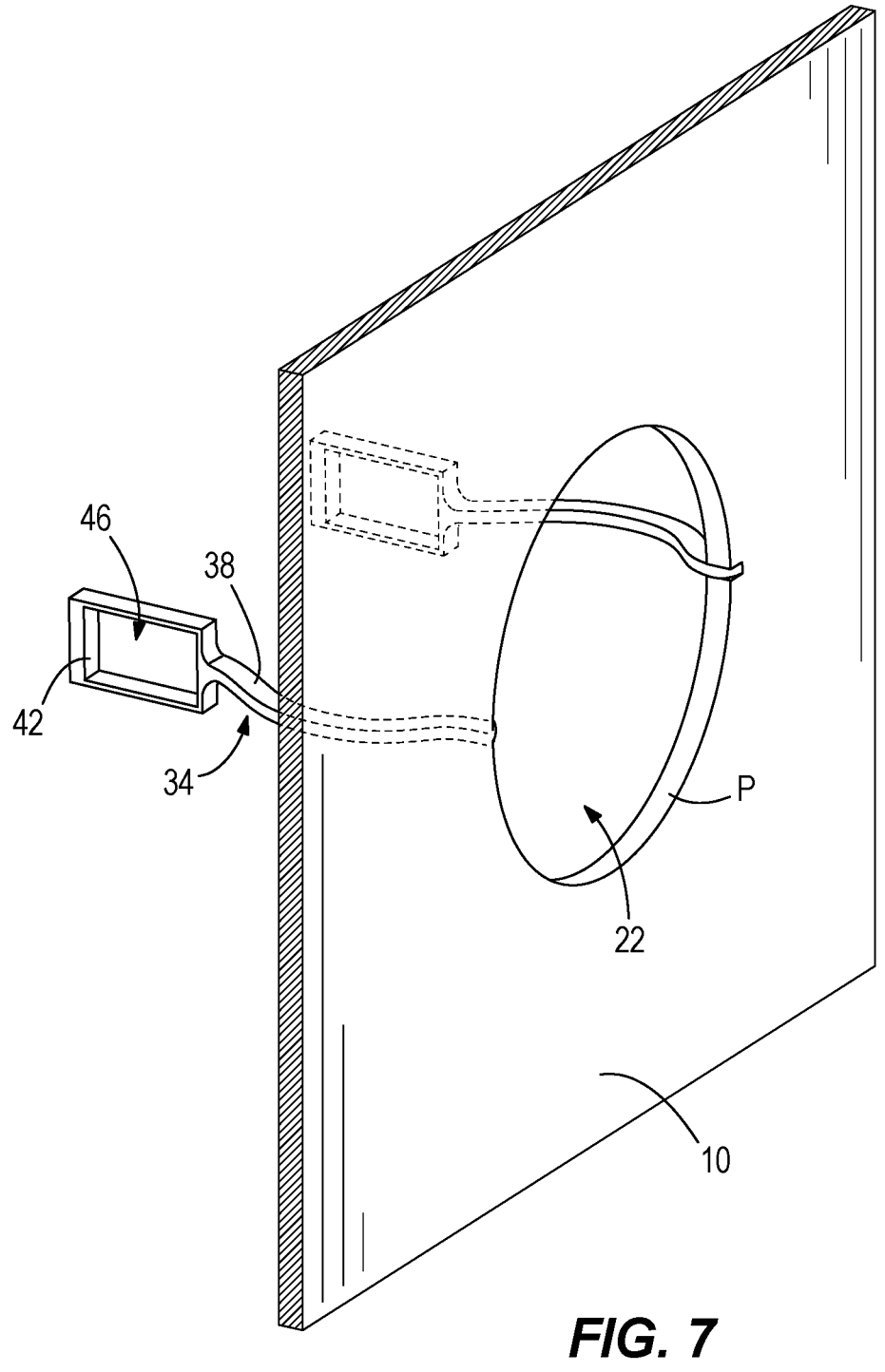
FIG. 7 is a perspective view of the sensor mounting formation.

As shown in FIG. 5, the tab 34 extends into the aperture 22 after the material removal process. The tab 34 is then deformed out of plane of the aperture 22 as shown in FIG. 6. In the illustrated embodiment, the stamping die set 50 includes a cylindrical die 52 sized and shaped to be inserted into the aperture 22 to deform the tab 34 out of plane of the aperture 22. In other words, the tab 34 is bent rearwardly and toward an interior of the bumper 10. In other embodiments, the tab 34 may be bent in other orientations, depending on the shape of the sensor 14 and the location on the sensor 14 to which the tab 34 is to be coupled. Following deformation of the tab 34, the sensor 14 is inserted into the aperture 22, and the support portion 42 of the tab 34 is coupled to the sensor 14 to support the sensor 14 relative to the bumper 10. The support portion 42 is coupled to the sensor 14 by means that will be understood by one of ordinary skill in the art, such as an interference fit. In some embodiments, the interference fit is due to interlocking of the sensor 14 and the support portion 42 to cause elastic deformation of the support portion 42, a portion of the sensor 14, or both. No intervening structure is positioned between the tab 34 and the sensor 14. Thus, no retainer is required to secure the sensor 14 to the bumper 10. It should be understood that the sensor mounting arrangement 20 is formed from material of the bumper 10, rather than being separately formed and secured to the bumper 10. The sensor mounting arrangement 20 is therefore not welded to the bumper 10 or fastened in any other way, but is formed from material that originally formed a portion of the bumper 10. While deformation of the tab 34 is described herein as a manufacturing step distinct from formation of the sensor mounting arrangement 20 and from coupling of the sensor 14 to the bumper 10, it should be understood that in some embodiments the tab 34 may be deformed during the material removal process (e.g., during stamping) or during insertion of the sensor 14 into the aperture 22.

What is claimed is:

1. A method of coupling a sensor to a metal bumper for a vehicle, the method comprising:

provided a substrate configured as a sheet of metal for forming the metal bumper;

forming an aperture within the sheet of metal; and

5

6 inserting the sensor into the aperture such that the sensor is directly supported by the sheet of metal without an intervening retainer.

2. The method of claim 1, wherein forming the aperture includes forming a perimeter of the aperture to receive the sensor therein and forming a tab configured to support the sensor.

3. The method of claim 2, wherein the tab is formed from material of the bumper originally located within the perimeter of the aperture.

4. The method of claim 3, wherein forming the aperture further comprises deforming the tab such that the tab is out of plane with the perimeter of the aperture.

5. The method of claim 2, wherein inserting the sensor into the aperture includes engaging the tab with a portion of the sensor and engaging the perimeter of the aperture with the sensor to secure the sensor to the metal bumper.

6. The method of claim 1, wherein further comprising shaping the substrate into a contour of the metal bumper, wherein the shaping the substrate into the contour of the metal bumper and the forming the aperture within the substrate occur simultaneously.

7. The method of claim 1, wherein providing the bumper includes providing the bumper with a steel sheet construction and forming the substrate into a shape of the bumper, and wherein the forming the substrate into the shape of the bumper occurs separate from the forming the aperture.

8. A method of coupling a sensor to a metal bumper for a vehicle, the method comprising:

providing the metal bumper;

forming an aperture within the metal bumper;

forming, from the material of the bumper, a tab configured to support the sensor, the tab extending at least partially inside a perimeter of the aperture; and inserting the sensor into the aperture such that the sensor is secured directly to the metal bumper without an intervening retainer.

9. The method of claim 8, further comprising forming, from the material of the bumper, an additional tab configured to support the sensor, wherein the tab and the additional tab are formed simultaneously.

10. The method of claim 9, wherein forming the tab and the additional tab includes deforming the tab and the additional tab out of plane of the aperture.

11. The method of claim 10, wherein the deforming the tab and the additional tab includes bending the tab and the additional tab toward an interior of the bumper.

12. The method of claim 11, wherein the deforming of the tab and the additional tab and the inserting of the sensor into the aperture occur simultaneously.

13. The method of claim 8, wherein providing the metal bumper includes providing the bumper with a steel sheet construction.

14. The method of claim 8, wherein forming the aperture includes stamping the aperture into the metal bumper.

15. The method of claim 14, wherein forming the tab includes stamping the tab.

16. The method of claim 8, further comprising maintaining a position of the sensor within the aperture by securing the sensor to the tab.

17. A metal bumper assembly for a vehicle, the assembly comprising:

a mounting portion configured to secure the metal bumper to the vehicle;

an aperture disposed within the metal bumper;

a tab integrally formed from the same material as the metal bumper, the tab extending from a perimeter of the aperture; and a sensor disposed within the aperture and coupled to the tab, such that the sensor is supported directly by the metal bumper without an intervening retainer.

18. The metal bumper assembly of claim 17, wherein the perimeter of the aperture is circular, and wherein the tab is formed from material originally located within the perimeter of the aperture.

19. The metal bumper assembly of claim 18, wherein the tab includes a spacer extending from the perimeter of the aperture and a support portion disposed at an end of the spacer opposite the perimeter of the aperture, wherein a length of the spacer is less than an arc length of the perimeter of the aperture, and wherein the support portion is configured to receive a portion of the sensor therein.

\* \* \* \* \*